Oct. 5, 1965          J. G. TYHURST          3,210,230
PROCESS FOR FORMING A LAMINATED PLASTIC STRUCTURE
Filed Nov. 21, 1961
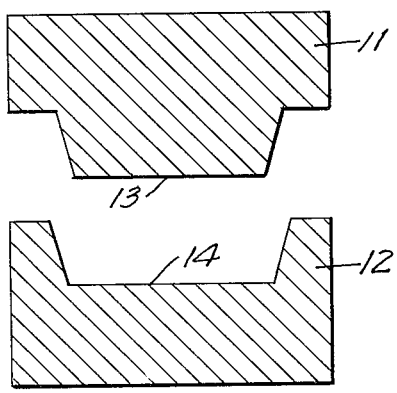
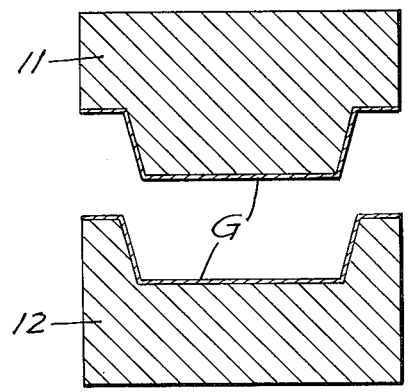
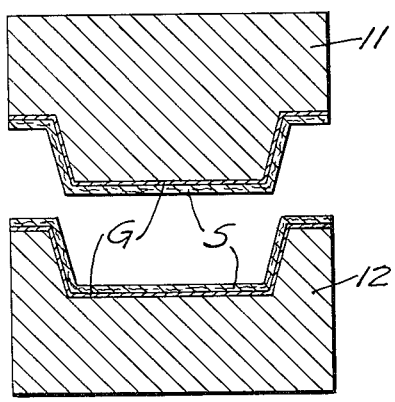
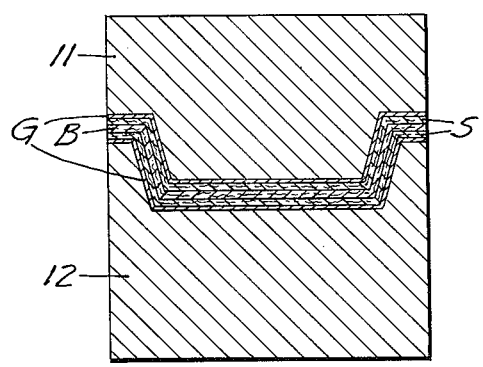
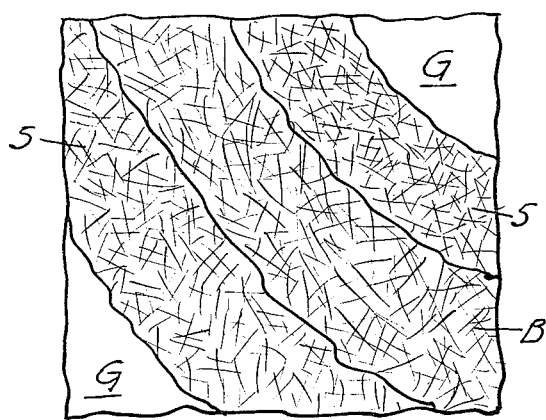
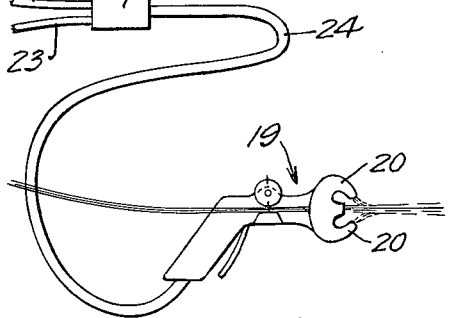
INVENTOR
JAMES G. TYHURST
BY
Williamson & Palmatier
ATTORNEYS

3,210,230
PROCESS FOR FORMING A LAMINATED PLASTIC STRUCTURE
James G. Tyhurst, North Minneapolis, Minn., assignor to Polystructures, Incorporated, Minneapolis, Minn., a corporation of Minnesota
Filed Nov. 21, 1961, Ser. No. 153,968
3 Claims. (Cl. 156—228)

This invention relates to a process for forming a laminated plastic structure and more particularly to a process of low compression molding for forming a laminated, fiber-reinforced plastic construction.

One of the existing problems in the plastic industry especially in the fields of match metal die molding systems and the lay up molding system is the lack of quality controls inherent in these systems.

Generally speaking, thermosetting plastics, such as polyester resins, are used in forming the structures through the use of these match metal die molding and lay up molding systems. In order to impart strength to molded articles, the plastic is reinforced with a fibrous material such as glass fiber. However, neither the match metal molding system nor the lay up molding systems are capable of producing fiber reinforced plastic structures having smooth finishes on all exposed surfaces.

It will be appreciated, for example, that in the match metal die molding systems, some of the fibers of the fiber reinforced resins will accumulate on the surface of the molded product thus producing a relatively rough finish. Further, the match metal die molding system often produces products having extensive surface porosity even though high compression presses are used in conjunction with the molds. It will, therefore, be seen that in the event a smooth surface is required, additional finishing of the surfaces is necessary. Fiber reinforced products produced by the lay up molding system also have at least one unfinished surface.

Another of the inherent quality control problems associated with match metal die molding system is the inability to radically vary the part thickness of the molded structure. Attempts to produce fiber reinforced plastic structures having shapes which radically vary with regard to the thickness dimensions have resulted in structures which are subject to warpage due to uneven curing of a plastic resin even through the use of "preforms." Further, it has also been found that attempts through match metal molding to produce structures which vary radically in part thickness have often resulted in products which have cracks and voids and are otherwise structurally unacceptable.

It has also been found that in these prior art molding systems the fiber to resin ratio cannot be readily changed if desired. Furthermore, neither the lay up or match metal molding systems permit "molding in" of great detail into the molded structure such as structural ribbing. Further, the cost of the match metal die molds, the presses and other equipment associated with match metal moldings are extremely high.

It is, therefore, an object of this invention to provide a novel, highly efficient economical process of low compression precision molding for forming laminated fiber reinforced plastic structures wherein the laminates are formed in a step-by-step operation thus permitting the formation of extremely accurate high strength structures of any desired contour and shape.

Another object of this invention is to provide a novel and improved process of low compression precision molding for forming fiber reinforced plastic structures wherein coats of preferably thermosetting plastic are applied, while in the uncured fluid state, to the mold members of a mold unit while the latter is in the open condition, the coats being allowed to at least partially cure, applying a bonding coat of uncured plastic material upon the partially cured coat at least on one of the mold members, closing the mold unit and applying slight compression thereto and thereafter allowing the bonding coat to cure thereby permitting the formation of plastic structural shapes having molded-in high gloss pigmented finishes on all exposed surfaces.

Another object of this invention is the provision of a novel and improved process of low compression precision molding for forming laminated fiber reinforced plastic structures, the process permitting radical variations in part thickness without the attendant dangers of warping and cracking due to uneven curing of the plastic thereby making possible the formation of various shaped structures with greater molded in detail than is currently possible with conventional match metal molding and lay up molding systems.

Another object of this invention is the provision of a novel and improved process of low compression precision molding for forming fiber reinforced laminated plastic structure, the process permitting a user to substantially reduce the initial tooling cost as well as production cost through the use of low cost inexpensive molds and other materials.

These and other objects and advantages of this invention will more fully appear from the following description made in connection with the accompanying drawings wherein like character references refer to the same or similar parts throughout the several views, and in which:

FIGS. 1 through 4 are diagrammatic views of a mold unit illustrating a step by step operation of the novel process;

FIG. 5 is a plan view of a laminated structural shape produced in accordance with the novel process with parts thereof broken away for clarity; and FIG. 6 is a resin and glass fiber applicator gun which may be advantageously used when practicing the novel process.

While only one particular structural laminated shape constructed in accordance with this novel process is illustrated, it will be understood, especially in view of the remarks appearing hereinbelow, that fiber reinforced laminated plastic structures having almost any shape or contour may be produced commercially through the carrying out of my novel process.

Referring now to FIGS. 1 to 4, it will be seen that the apparatus used in carrying out my novel process includes a mold unit comprised of a pair of mold members 11 and 12 respectively. The mold unit is of the separable type so that the mold members 11 and 12 may be moved apart or in some instances completely separated to permit carrying out the steps of my novel process. The mold member 11 has a highly polished mold surface 13 and the mold member 12 also has a highly polished mold surface 14. Actually the mold member 11 constitutes a male mold member in the embodiment illustrated in FIGS. 1 to 4 while the mold member 12 constitutes a female mold member. As pointed out above, the mold units used for carrying out my novel process may have mold surfaces which produce almost any shape as desired although only one is illustrated in the drawing.

It is pointed out that the mold unit may be formed of any of the common materials used in the making of molds such as cast aluminum, steel, plastic, wood or the like. However, since our unique method contemplates only the use of low compression, the molds may be made by relatively inexpensive material and in the mold unit illustrated in the drawing, the mold unit is formed of a glass fiber reinforced thermosetting plastic material. It also is pointed out that while these molds can be produced inexpensively, highly accurate and precision molding may be accomplished through the use of my novel process.

In carrying out my novel process, the mold surfaces 13 and 14 of the respective mold members 11 and 12 are first coated with a conventional release mechanism, such as polyvinyl alcohol or a silicone. Wax releases may be advantageously used to coat the respective mold surfaces of the mold such as a common household wax. It is also pointed out that the mold surfaces can be Teflon coated so that a release would be built into the mold unit.

After the respective mold surfaces 13 and 14 of the mold unit have been coated with the conventional release mechanism, a smooth fiber-free thermosetting plastic material is applied to the mold surfaces 13 and 14 to completely coat these mold surfaces. This fiber-free thermosetting plastic may be either a polyester or an epoxy resin and these resins are applied while in the fluid or uncured state preferably by a spraying operation. This mooth or gel coat is transparent or it may have a molded in pigment so that additional coloring through painting will not be necessary. The application of the smooth or gel coat to the molding surfaces of the mold members is illustrated in FIG. 2, the fiber-free smooth coat being designated by the reference letter G.

The smooth or gel coating G on each of the respective molding members 11 and 12 are allowed to polymerize or at least partially cure so that resins are dimensionally stable.

In the next step, a fiber reinforced thermosetting plastic coating, designated by reference letter S and illustrated in FIG. 3, is applied to the respective polymerized gel or smooth coatings on the mold members. This thermosetting fiber reinforced plastic may also be either a polyester type or epoxy resin as in the case of the smooth gel coating. The fibrous material is preferably glass fiber although other fibrous material such as nylon, asbestos may also be used.

This fiber reinforced or skin coating S is preferably applied by means of a spray gun 19 as best seen in FIG. 6. Although illustrated diagrammatically, the spray gun may be any one of the conventional types. These conventional guns chop and eject the strands of glass fiber, and simultaneously coat the ejected fibers with a thermosetting resin. In some of the guns now used in molding industry the gun is provided with a pair of discharge nozzles 20 which are disposed in angulated relation with respect to the ejecting stream of fibers. Through one of the nozzles a spray of promoter resin is ejected while the catalyzing resin is ejected through the other nozzle so that the chopped fibers are coated with the uncured resin.

However, in order to obtain even curing we have provided a premixing valve device, designated generally by the reference numeral 21 having a pair of conduits 22 and 23 connected in communicating relation therewith. These conduits 22 and 23 are connectible to sources of the respective catalyzer and promoter resins. A conduit 24 is connected to the valve 21 in communicating relation therewith which is also connected to the gun 19 in communicating relation to the nozzles. The promoted and catalyzed resins are premixed in the valve so that the premixed resins are ejected through both nozzles. It will be seen that when the trigger of the gun is actuated, the resins are then forced through the gun nozzles to coat the chopped fibers with the mixed resin to thereby permit even curing of the resin. A detailed description of this gun is not thought to be necessary in this application since any of the conventional guns for applying the resin and chopped fibers commonly in use in the trade may be used. The use of an applicator gun, however, permits the fibers to be disposed in random fashion thus avoiding alignment of the fibers in a given direction. This random disposition of the fibers imparts strength to the final molded structure especially with regard to shear stresses.

After the skin coatings are applied to the respective gel or smooth coating of each of the mold members, these fiber reinforced skin coatings are rolled or are otherwise compressed to remove air bubbles and the coatings then are allowed to polymerize.

After the skin or fiber reinforced coatings are allowed to polymerize, a bonding coating, preferably of fiber reinforced plastic polyester or epoxy resin, is applied to one of the partially cured skin coats and the two mold members are then placed in opposed matching relationship as illustrated in FIG. 4. These mold members are then subjected to slight compression and the bonding coating, designated by the reference letter B, is allowed to cure. Thereafter, the laminate molded structure is removed from the mold members.

It will be seen that because of this step-by-step application of the respective coatings including the polymerization of these coats, and the final slight compression of the bonding coating between the respective fiber reinforced skin coatings, there is fiber to fiber contact throughout the strength imparting portion of the structure. The random fashion in which the fibers are disposed also imparts additional strength to the structure especially when subjected to shear stress. Further, the use of a bonding coating or lamination comprised of preferably the same kind of fiber reinforced resin as the skin coating not only permits fiber to fiber contact but also obviates the need of a compatible plastic cement.

It will also be seen that inasmuch as the smooth or gel coating is at least partially cured or polymerized, the surfaces of the molded structure will be completely smooth and will not have any surface porosity. It will also be appreciated that through the use of this method the part thickness may vary since the various parts to be molded may be readily controlled during the molding process.

In this connection it will be seen that since the contour and shape forming mold surfaces of the respective mold members are always readily accessible for application of the various coatings, the parts of the structure to be molded which are to vary in thickness may be built up or formed and allowed to polymerize gradually. This eliminates the problem associated with uneven curing of thick and thin parts.

Further the glass to resin ratio can be readily changed at the will of the molder thus permitting the production of high strength thin cross sectional shapes. The last steps of the molding process, that of applying the bonding coating, disposing the molds in opposed relation and subjecting the molds to slight compression causes the bonding coating B to flow completely over the surface area defined by skin coatings since the resin will be in the fluid uncured state. It will be appreciated that in the event fibers are used in the bonding coat, even if these fibers assume a flow pattern, the pattern of the fibers in this layer will in no way alter the strength of the structure since the respective skin coatings of the mold structure will have the fibers disposed in random fashion.

The following examples illustrate some methods of producing fiber reinforced laminated plastic structure according to my novel process. It is to be understood, however, that the invention is by no means limited to the specific methods described in the examples.

*Example I*

A fiber-free polyester, pigmented resin is sprayed while in the fluid or uncured state upon the mold surfaces 13 and 14 by means of a conventional spray gun. The polyester resin used in this smooth or gel coating may be any of the commercial pigmented brands which include a preselected pigment and a polyester filler resin. This smooth or gel coating is then allowed to polymerize or cure.

A fiber reinforced skin coating S is then applied to each of the pigmented gel coatings and the skin coating is comprised of a polyester resin reinforced with glass fiber. The reinforcing glass fiber fibers are not less than ⅛ of an inch in length and preferably in the preferred embodiment approximately 1 inch in length. This skin coating S is preferably applied with an applicator gun and the fibers will be disposed in random fashion. The promoted resin may be any of the conventional promoter polyester resins such as are promoted by dimethyl analine or diethyl analine. The catalyzed resin may be any of the conventional catalyzed resins such as may be catalyzed by benzoyl peroxide.

The skin coating S is applied preferably by spray to the smooth or gel coating G on both the mold members and are then allowed to cure at room temperature until the resin is sufficiently polymerized. Thereafter, the bonding coating is applied which also comprises a glass fiber reinforced polyester bonding resin and is preferably applied with an applicator gun and includes a promoted resin and catalyzed resin ratio as in the skin coating. This bonding coating is applied to the cured skin coating on only one of the mold members and the mold unit is then closed so that the mold members are in opposed relationship. The mold is then subjected to slight compression of approximately 1½ to 2 p.s.i. thus causing a bonding coating to flow evenly throughout the surface areas of the skin coating and this bonding coating is then allowed to cure. The temperature is elevated to between 130° and 150° F., to accelerate curing of the bonding coating.

*Example II*

A fiber-free epoxy resin having a molded in pigment is applied to the respective molding surfaces 13 and 14 of the mold members 11 and 12 and allowed to cure at room temperature. These fiber-free coatings on the mold member comprise the smooth or gel coatings. Thereafter, skin coatings comprised of glass fiber reinforced epoxy resin are sprayed upon the respective polymerized smooth or gel coatings on each of the mold members in the manner of Example I. The glass fiber reinforced epoxy skin coatings are also applied with a resin and glass fiber applicator gun wherein conventional epoxy hardener and resins are mixed and applied to the chopped fibers. These glass fiber reinforced skin coatings are then preferably compressed as by rolling to remove the air bubbles and are then allowed to cure at room temperature.

Thereafter a bonding coating, also comprised of a glass fiber reinforced epoxy resin is applied preferably by an applicator gun to the polymerized skin coating on one of the mold members. The mold members are then placed together closing the mold unit, while the fiber reinforced bonding coating is in the uncured state and the mold unit being subjected to slight compression of approximately 1½ to 2 p.s.i. The temperature is raised to between 130° and 150° F., and the bonding coating is then allowed to polymerize or cure.

As an alternative form of the invention, the smooth or gel coating may be entirely omitted since in some structures smooth finished surfaces are not necessary. Further, in other structure the gel coating may be applied to only one of the mold members since the structure to be molded may have a concealed surface which need not be finished.

It will be seen from the foregoing description that I have provided a novel process which permits the formation of fiber reinforced laminated plastic structures through low compression precision molding principles. It will be appreciated that the process makes possible the formation of laminated structures wherein the part thickness may radically vary without the attendant danger to warpage and subsequent cracking or distortion. It will also be seen that through the use of this process a high degree of control is attained during each step of the molding operation so that not only may part thickness be radically varied but the ratio of resin to fiber may be readily varied.

By readily varying the resin to fiber ratio, it is possible to control the physical characteristics of the structures to be molded so that the varying degree of strength and resiliency as well as other physical characteristics may be obtained through the use of my process. It will also be appreciated that through my novel process great structural details may be produced in the molded structure such as molded in ribbing and the like which was heretofore not possible through match metal die molding and conventional lay up molding systems. The random disposition of the fibers permits structures to be produced which have high flexural strength and yet allow the structure to have relatively thin cross sections. It will also be seen that fiber reinforced plastic structures having high gloss pigmented surfaces with little or no surface porosity may be produced through the use of my process.

From the foregoing, it will be seen that my novel process makes possible the use of inexpensive molds and mold forming material.

Thus, it will be seen that I have provided a process which makes possible low compression precision molding for producing fiber reinforced plastic structure of varying shapes, forms and dimensions that was heretofore not possible. Further, my novel process permits continuous line operation in a manner to effect great savings in labor and material.

It will, of course, be understood that various changes may be made in the form, details, arrangement and proportions of the various parts without departing from the general scope of my invention.

I claim:

1. The process of low compression molding for forming a laminated, fiber-reinforced plastic structure, which process consists in first applying a coating of a release agent on the respective molding surfaces of a pair of mold members of a separable mold unit while the mold unit is in the open separated condition, then applying a coating of fiber free thermo-setting plastic resin in the fluid uncured state to each of said molding surfaces, thereafter allowing the fiber free resin coating on the respective mold members to at least partially cure, subsequently applying a coating of fiber-reinforced thermo-setting plastic resin in fluid uncured state on the respective fiber free coating of each of the mold members, thereafter applying rolling pressure to each of said last named coatings whereby to expel included air therefrom, then allowing the fiber-reinforced coatings on each of the mold members to at least partially cure, thereafter applying a bonding coating of a thermoset-setting plastic resin in fluid uncured state upon the partially cured fiber-reinforced coating on at least one of the mold members, subsequently closing the mold unit to dispose the molding surfaces of each of the mold members in opposed relation and applying slight compression to the mold members to cause the bonding coating to flow over and completely coat the respective partially cured fiber-reinforced coatings on each of the mold members, and thereafter allowing said bonding coating to cure.

2. The process of low compression molding for forming a laminated, fiber-reinforced plastic structure, which process consists in first applying a coating of a release agent on the respective molding surfaces of a pair of mold members of a separable mold unit while the mold unit is in the open separated condition, then applying a coating of fiber free thermo-setting plastic resin in the fluid uncured state on the molding surface of one of said molding members, then allowing the fiber free coating on the said mold member to at least partially cure, thereafter applying a coating of fiber-reinforced thermosetting plastic resin in the fluid uncured state on the fiber free coating on said mold member and on the other mold member molding surface, subsequently allowing the fiber-reinforced coatings on each of the mold members to at least partially cure, applying rolling pressure to said last coatings to expel air therefrom after application thereof, thereafter applying a bonding coating of a thermosetting plastic resin in fluid uncured state upon the partially cured fiber-reinforced coating on at least one of the mold members, then closing the mold unit to dispose the molding surfaces of each of the mold members in opposed relationship and applying slight compression to the said mold members to cause the bonding coating to flow over and completely coat the respective partially cured fiber-reinforced coatings on each of the mold members, and thereafter allowing said bonding coating to cure.

3. A process as in claim 2 wherein the bonding coating has reinforcing fibers therein.

References Cited by the Examiner
UNITED STATES PATENTS

| | | | |
|---|---|---|---|
| 2,274,095 | 2/42 | Sawyer | 156—224 |
| 2,494,848 | 1/50 | Whitelegg | 156—279 |
| 2,613,397 | 10/52 | Borkland | 156—224 |
| 2,688,580 | 9/54 | Fingerhut. | |
| 2,861,910 | 11/58 | Johnston et al. | |
| 2,905,580 | 9/59 | Kreier. | |
| 2,931,739 | 4/60 | Marzocchi et al. | |

FOREIGN PATENTS

| | | |
|---|---|---|
| 614,633 | 2/61 | Canada. |
| 1,174,216 | 3/59 | France. |

EARL M. BERGERT, *Primary Examiner.*

MICHAEL V. BRINDISI, *Examiner.*